J. A. WOOD.
Harrow Attachment for Wheel-Plows.
No. 206,409. Patented July 30, 1878.
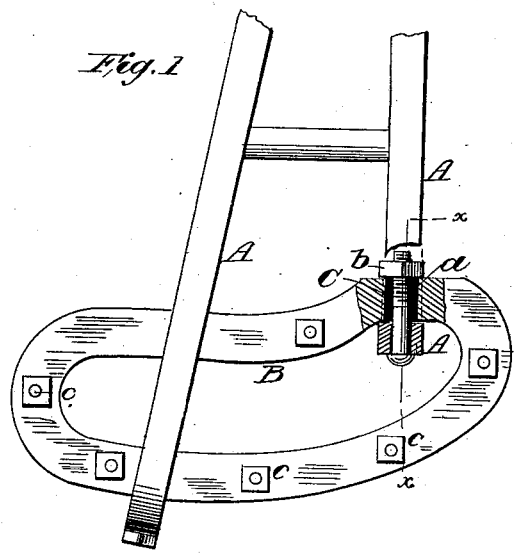
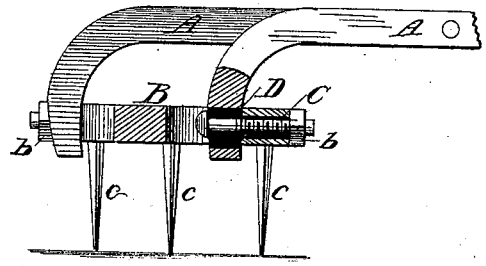
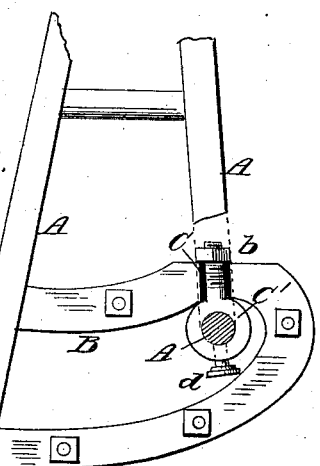
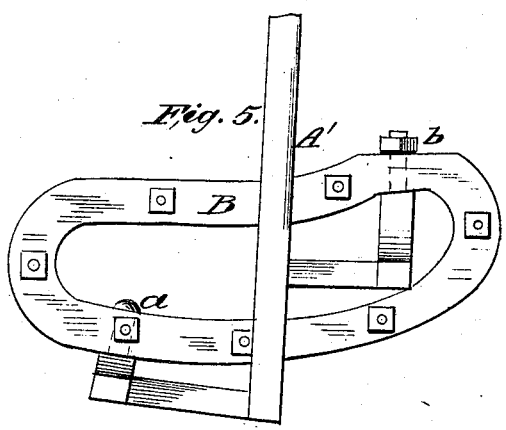
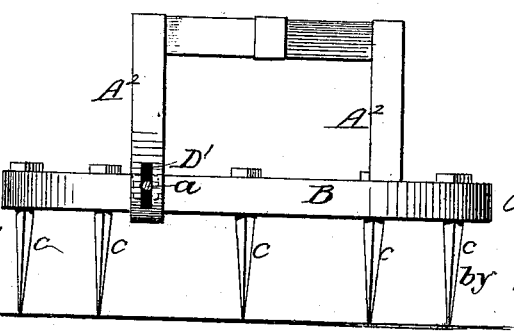
Witnesses:
Fred G. Dieterich
Edwin F. Smith
Inventor
James A. Wood
by W. H. Goddard
atty

UNITED STATES PATENT OFFICE.

JAMES A. WOOD, OF GAYNORSVILLE, INDIANA.

IMPROVEMENT IN HARROW ATTACHMENTS FOR WHEEL-PLOWS.

Specification forming part of Letters Patent No. 206,409, dated July 30, 1878; application filed May 27, 1878.

*To all whom it may concern:*

Be it known that I, JAMES A. WOOD, of Gaynorsville, in the county of Decatur and State of Indiana, have invented certain new and useful Improvements in Harrow Attachments for Wheel-Plows; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a top view of my improved harrow as applied to the beams of a wheel-plow. Fig. 2 is a cross-section of the same. Fig. 3 is a top view, and Fig. 4 a horizontal sectional view, showing, however, different fastening devices. Figs. 5 and 6 are top and side views, respectively, showing my improved harrow as applied to a single double-shovel plow.

This invention relates to improvements in harrows which can be easily and quickly applied to wheel and other plows; and the invention consists, essentially, in the construction of a harrow adapted to said purposes, as will be hereinafter fully described.

In the drawing, B represents my improved harrow, constructed, essentially, of the form shown in Figs. 1, 3, and 5, and provided with the usual teeth $c$. The harrow is provided with elongated slots C C, arranged transversely through the front and rear beams thereof diagonally across from each other. Through said slots pass the fastening-bolts $a$ $a$, by which the harrow is adapted to be secured to the beams or stocks of any kind of double or other plow, and with any kind of beam or stock, whether square, round, flat, or other shape.

The slots, being elongated, permit the fastenings to be moved forward or backward, or adjusted therein to be adapted to the beams or stock, whether close together or far apart, as the case may be.

In Figs. 1, 2, 5, and 6 the fastening consists of screw-bolts, which pass both through the slotted beams and stocks of the harrow and plow, and are secured therein in the usual manner.

In Fig. 3 the eye or ring bolts are used, and through which the ends of the plow beams or stocks pass, being secured therein by the set-screws $d$.

In Fig. 4 the fastening device consists of a yoked bolt, the ends of the plow beams or stocks being secured therein by the usual nuts and washers $e$ $e'$.

It will therefore be observed that with my improved harrow and different fastenings, herein shown and described, the harrow is adapted to any of the double or other plows having differently-shaped beams or stocks, and to whatever distance apart the plow beams or stocks may be.

I am aware that an ordinary straddle-row cultivator the beams of which are provided with two shovel or plow standards, to which the harrows, composed of two parallel toothed beams connected together by adjustable cross-bars, are secured, is old, and such I do not claim as my invention; but

I claim as my invention—

The herein-described harrow, constructed as shown, and having its beams provided with transverse elongated slots C C, and fastening devices passing through said slots and adapted to be applied to differently-shaped beams of double or other plows, substantially as specified.

In testimony that I claim the foregoing as my own I affix my signature in presence of two witnesses.

JAMES A. WOOD.

Witnesses:
   JESSE M. THOMSON,
   DYAR C. ELDER.